United States Patent
Zhang

(10) Patent No.: US 10,882,066 B2
(45) Date of Patent: Jan. 5, 2021

(54) DEVICE FOR DETECTING AND REPLENISHING SALT SOLUTION IN SALT SPRAY MACHINE AND SALT SPRAY MACHINE THEREOF

(71) Applicant: CITIC DICASTAL CO., LTD, Hebei (CN)

(72) Inventor: Ning Zhang, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 41 days.

(21) Appl. No.: 16/266,862

(22) Filed: Feb. 4, 2019

(65) Prior Publication Data
US 2019/0381531 A1 Dec. 19, 2019

(30) Foreign Application Priority Data
Jun. 15, 2018 (CN) .......................... 2018 1 0616452

(51) Int. Cl.
| | |
|---|---|
| *B05B 14/49* | (2018.01) |
| *G01N 27/416* | (2006.01) |
| *B05C 5/02* | (2006.01) |
| *B05C 11/10* | (2006.01) |
| *G01N 17/00* | (2006.01) |
| *B05B 12/08* | (2006.01) |

(52) U.S. Cl.
CPC ............ *B05B 14/49* (2018.02); *B05C 5/0291* (2013.01); *B05C 11/101* (2013.01); *G01N 27/4167* (2013.01); *B05B 12/081* (2013.01); *G01N 17/002* (2013.01)

(58) Field of Classification Search
CPC ....... B05B 14/49; B05B 12/081; B05B 15/12; B05B 9/0403; G01N 27/4167; G01N 17/002; G01N 17/006; G05D 9/12; B05C 15/00; B05C 5/00; B05C 5/0208; B05C 11/101
USPC ................................ 118/326, 694, 689, 712
See application file for complete search history.

(56) References Cited

U.S. PATENT DOCUMENTS

| | | | | |
|---|---|---|---|---|
| 5,624,535 | A * | 4/1997 | Tsuchikawa | .......... C02F 1/4618 |
| | | | | 204/228.2 |
| 5,824,918 | A * | 10/1998 | Zuk | ...................... G01N 17/002 |
| | | | | 73/865.6 |
| 2013/0164852 | A1* | 6/2013 | Fujii | .................... G01N 17/006 |
| | | | | 436/6 |

* cited by examiner

*Primary Examiner* — Laura Edwards
(74) *Attorney, Agent, or Firm* — IPro, PLLC; Qian Gu

(57) ABSTRACT

A device for detecting and replenishing a salt solution in a salt spray machine and the salt spray machine includes a salt solution collector installed at the bottom of the salt spray machine and configured to collect the salt solution, a return pipe is connected to the salt solution collector and the salt solution storage tank, and a pH value sensor, a water level sensor and the salt concentration sensor are connected to the salt solution storage tank.

9 Claims, 3 Drawing Sheets

DEVICE FOR DETECTING AND REPLENISHING SALT SOLUTION IN SALT SPRAY MACHINE AND SALT SPRAY MACHINE THEREOF

CROSS REFERENCE TO RELATED APPLICATION

This application claims priority to Chinese Patent Application No. 201810616452.0, entitled DEVICE FOR DETECTING AND REPLENISHING SALT SOLUTION IN SALT SPRAY MACHINE AND SALT SPRAY MACHINE THEREOF and filed on Jun. 15, 2018, which is incorporated herein by reference for all purposes.

FIELD OF THE INVENTION

The present invention relates to the technical field of experimental analysis, specifically to a device for detecting and replenishing a salt solution in a salt spray machine.

BACKGROUND OF THE INVENTION

The salt spray tester is called "salt spray test chamber". The reliability of a sample to be tested is detected by salt spray corrosion. Salt spray refers to a dispersion system composed of tiny droplets containing salt in the atmosphere, and is one of three-proof series of an artificial environment. Many enterprise products need to simulate the destructiveness of the surrounding climate of the ocean to products, so salt spray test chambers have emerged. The salt spray test chambers are divided into two types including neutral salt spray and acid salt spray, which are different in standards and test methods that are also known as "NSS" (neutral salt spray) and "CASS" (acetic acid salt spray) tests, and the salt spray test method is the most common test method in the artificial three-proof climate.

In the conventional salt spray tester, the salt solution is replenished manually, which requires long-term observation and monitoring by humans. During the long-term test, the test results may be affected due to drastic changes in parameters such as liquid level. A liquid level control device for a salt solution in a liquid storage tank with automatic detection and automatic adjustment functions is urgently needed.

SUMMARY OF THE INVENTION

Accordingly, an object of the present invention is to provide a device for detecting and replenishing a salt solution in a salt spray machine so as to overcome the above problems.

A device for detecting and replenishing a salt solution in a salt spray machine, the device comprising a salt solution collector, a return pipe, a salt solution storage tank, a PLC (programmable logic controller), a pH value sensor, a water level sensor, a salt concentration sensor, a solenoid valve relay, a touch screen and a pump relay, the salt solution collector is installed at the bottom of the salt spray machine and configured to collect the salt solution, and the return pipe is connected to the salt solution collector and the salt solution storage tank; the pH value sensor, the water level sensor and the salt concentration sensor are connected to the salt solution storage tank; the solenoid valve relay and the pump relay are respectively connected to the salt solution storage tank; the PLC is in data connection with the pH value sensor, the water level sensor and the salt concentration sensor respectively, and receives a pH value signal, a liquid level signal and a salt concentration signal from same respectively; the PLC is configured to send a solenoid valve control signal and a pump control signal to the solenoid valve relay and the pump relay according to the pH value signal, the liquid level signal and the salt concentration signal, and to receive a solenoid valve relay working state signal and a pump relay working state signal from the solenoid valve relay and the pump relay; the PLC is configured to display the pH value signal, the liquid level signal, the salt concentration signal, the solenoid valve relay working state signal and the pump relay working state signal on the touch screen, and to receive an operation signal from the touch screen; and the PLC is configured to control the solenoid valve relay and the pump relay according to the operation signal received from the touch screen.

A flow cell is further included between the return pipe and the collector, the pH value sensor and the salt concentration sensor are respectively installed on the flow cell, and the return pipe is further connected to one side of the flow cell.

The pH valve sensor is selected from the group consisting of an antimony electrode acidity sensor and a sodium electrode concentration sensor.

The PLC is configured to acquire a pH value signal, a water level signal and a salt concentration signal of the pH value sensor, the water level sensor and the salt concentration sensor every minute.

The salt solution storage tank is also connected to a salt solution replenishing tank by a pipe, and the inlet of the salt solution storage tank is controlled by the solenoid valve relay.

The liquid level sensor is installed below the salt solution storage tank, and the liquid level sensor is a liquid level pressure sensor.

The PLC is configured to control the solenoid valve relay to be turned on and allow the salt solution to enter the salt solution storage tank when the liquid level signal transmitted by the liquid level sensor is lower than a lower limit threshold; and to control the solenoid valve relay to be turned off and stop the salt solution to enter the salt solution storage tank when the liquid level signal transmitted by the liquid level sensor is higher than the lower limit threshold.

The salt solution collector comprises a liquid collection funnel, a liquid delivery pipe, a sensor and an overflow return pipe, the output end of the liquid collection funnel being connected to the liquid delivery pipe, and the liquid delivery pipe being connected to the sensor and the overflow return pipe.

The salt solution storage tank and the salt solution replenishing tank are respectively arranged at the top of the salt spray chamber, the salt solution storage tank is connected to the salt solution replenishing tank by a pipe, and the inlet of the salt solution storage tank is controlled by the solenoid valve relay; the salt solution storage tank is connected to a salt spray chamber pipe, and the salt spray chamber pipe is connected to a salt spray chamber nozzle.

The device and the salt spray machine of the present invention have the advantages that the current value and the on-off state can be displayed in real time through the touch screen; the touch screen can display the historical curve and reflect the change of the salt spray environment; the PLC can control the liquid level of the salt solution storage tank to achieve automatic replenishment; and if the liquid level in the salt solution storage tank is lower than the set value and the salt solution is not replenished, the touch screen will display alarm information.

BRIEF DESCRIPTION OF THE DRAWINGS

The embodiments of the present invention will be described in detail below in combination with the accompanying drawings, in which:

FIG. 3 shows schematic diagrams of sensors, wherein

DETAILED DESCRIPTION OF THE EMBODIMENT

Embodiment 1

Figure 1:
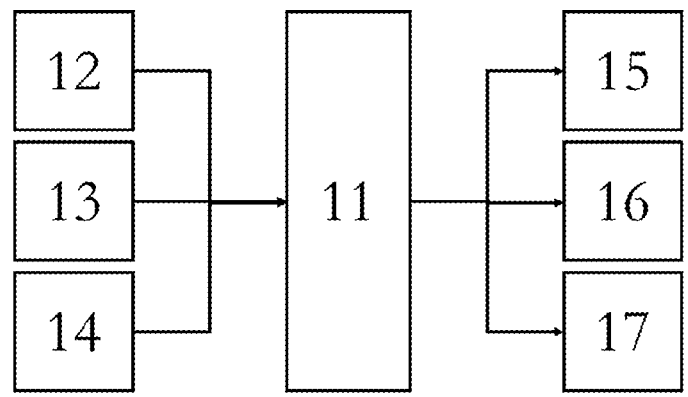
FIG. 1 is a schematic diagram of a circuit connection structure of a device according to the present invention, in which: 11 PLC, 12 pH value sensor, 13 water level sensor, 14 salt concentration sensor, 15 solenoid valve relay, 16 touch screen, 17 pump relay.
Figure 2:
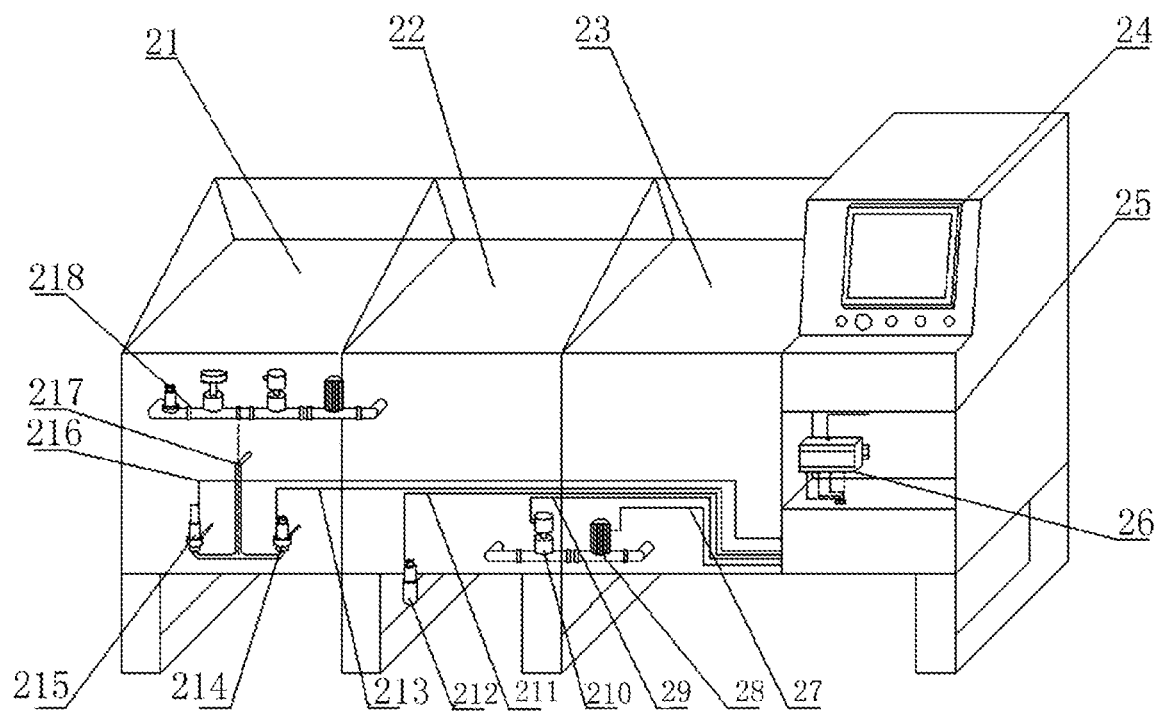
FIG. 2 is a schematic diagram of a physical structure of the device according to the present invention, in which: 21 salt spray chamber, 22 salt solution storage tank, 23 salt solution replenishing tank, 24 touch screen, 25 electric control box, 26 PLC, 27 salt solution supply pump control line, 28 salt solution supply pump, 29 salt solution supply solenoid valve control line, 210 salt solution supply solenoid valve, 211 liquid level signal line, 212 liquid level sensor, 213 salt concentration signal line, 214 salt concentration sensor, 215 pH value sensor, 216 pH value sensor signal line, 217 liquid collection device, 218 salt spray chamber pipe.

In the present embodiment, disclosed is a device for detecting and replenishing a salt solution in a salt spray machine, the device comprising a salt solution collector, a return pipe, a salt solution storage tank, a PLC, a pH value sensor, a water level sensor, a salt concentration sensor, a solenoid valve relay, a touch screen and a pump relay, wherein the salt solution collector is installed at the bottom of the salt spray machine and configured to collect the salt solution, and the return pipe is connected to the salt solution collector and the salt solution storage tank; the pH value sensor, the water level sensor and the salt concentration sensor are connected to the salt solution storage tank; the solenoid valve relay and the pump relay are respectively connected to the salt solution storage tank; the PLC is in data connection with the pH value sensor, the water level sensor and the salt concentration sensor respectively, and receives a pH value signal, a liquid level signal and a salt concentration signal from same respectively; the PLC is configured to send a solenoid valve control signal and a pump control signal to the solenoid valve relay and the pump relay according to the pH value signal, the liquid level signal and the salt concentration signal, and to receive a solenoid valve relay working state signal and a pump relay working state signal from the solenoid valve relay and the pump relay; the PLC is configured to display the pH value signal, the liquid level signal, the salt concentration signal, the solenoid valve relay working state signal and the pump relay working state signal on the touch screen, and to receive an operation signal from the touch screen; and the PLC is configured to control the solenoid valve relay and the pump relay according to the operation signal received from the touch screen. A flow cell is further included between the return pipe and the collector, the pH value sensor and the salt concentration sensor are respectively installed on the flow cell, and the return pipe is further connected to one side of the flow cell. The pH valve sensor is selected from the group consisting of an antimony electrode acidity sensor and a sodium electrode concentration sensor. The antimony electrode acidity sensor and the sodium electrode concentration sensor are supplied with power of 24 V, and the output is a current signal of 4-20 mA or a voltage signal of 0-10 V. The PLC is configured to acquire a pH value signal, a water level signal and a salt concentration signal of the pH value sensor, the water level sensor and the salt concentration sensor every minute. The salt solution storage tank is also connected to a salt solution replenishing tank by a pipe, and the inlet of the salt solution storage tank is controlled by the solenoid valve relay. The liquid level sensor is installed below the salt solution storage tank, and the liquid level sensor is a liquid level pressure sensor. The PLC is configured to control the solenoid valve relay to be turned on and allow the salt solution to enter the salt solution storage tank when the liquid level signal transmitted by the liquid level sensor is lower than a lower limit threshold; and to control the solenoid valve relay to be turned off and stop the salt solution to enter the salt solution storage tank when the liquid level signal transmitted by the liquid level sensor is higher than the lower limit threshold. The salt solution collector comprises a liquid collection funnel, a liquid delivery pipe, a sensor and an overflow return pipe, wherein the output end of the liquid collection funnel is connected to the liquid delivery pipe, and the liquid delivery pipe is connected to the sensor and the overflow return pipe.

The above device for detecting and replenishing a salt solution in a salt spray machine is installed to the salt spray machine. Specifically, the salt solution storage tank and the salt solution replenishing tank are respectively arranged at the top of the salt spray chamber, the salt solution storage tank is connected to the salt solution replenishing tank by a pipe, and the inlet of the salt solution storage tank is controlled by the solenoid valve relay; the salt solution storage tank is connected to a salt spray chamber pipe, and the salt spray chamber pipe is connected to a salt spray chamber nozzle.

Figure 3A:
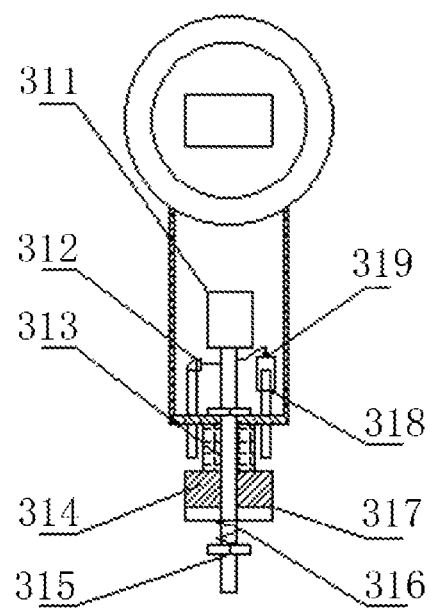
FIG. 3A is a schematic diagram of an antimony electrode acidity sensor.
Figure 3B:
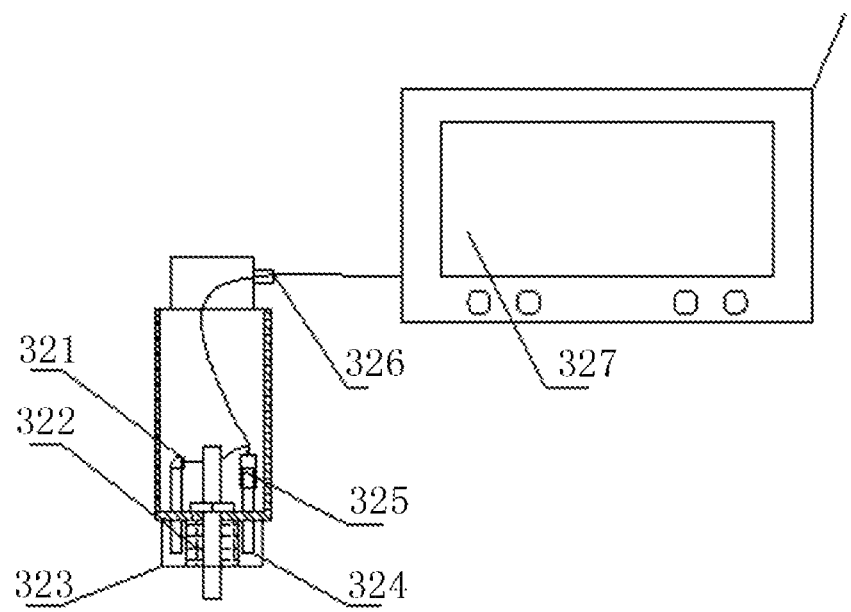
FIG. 3B is a schematic diagram of a sodium electrode concentration sensor, in which: 311 motor, 312 temperature compensation resistor, 313 insulating cup, 314 antimony electrode, 315 nut, 316 compression spring, 317 cleaning brush, 318 salt bridge, 319 calomel reference electrode, 321 temperature compensation resistor, 322 sodium electrode, 323 sensor housing, 324 reference electrode, 325 cable, 326 sodium ion temperature monitor.
Figure 4:
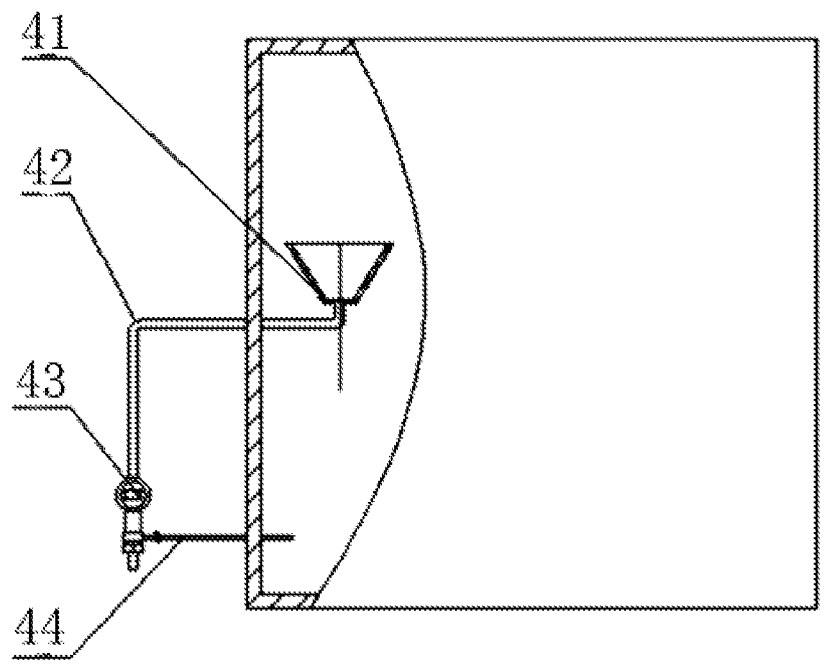
FIG. 4 is a schematic diagram of the salt solution collector, in which: 41 liquid collection funnel, 42 liquid delivery pipe, 43 sensor, 44 overflow return pipe.
Figure 5:
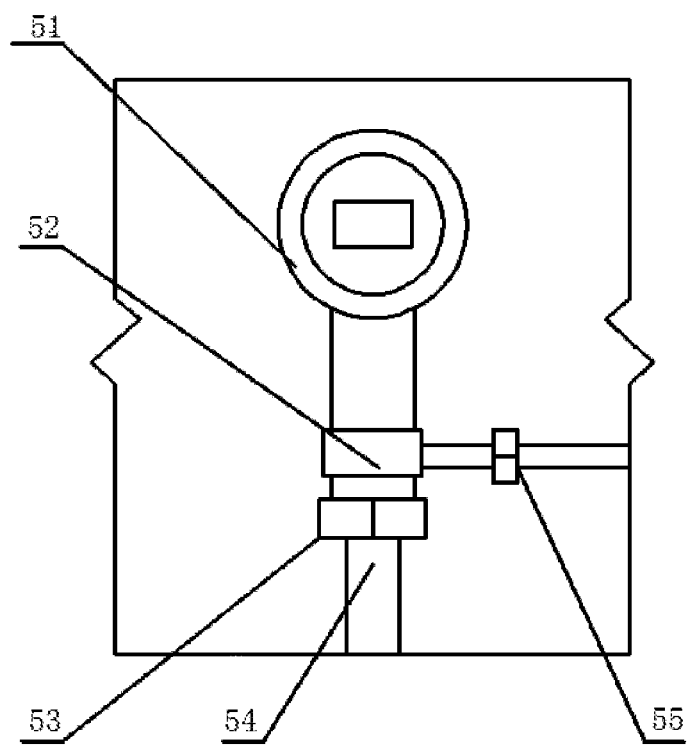
FIG. 5 is an installation diagram of a sensor, in which 51 sensor, 52 flow cell, 53 instrument holder, 54 collection pipe, 55 return pipe.

In the working state, the pH value sensor and the salt concentration sensor are installed on the flow cell, and are connected to the collector by pipes. The salt solution is collected by the collector in the salt spray machine, and the liquid deposited at the lower part of the chamber body of the salt spray machine is guided out by a liquid guide pipe, and then connected to the flow cell of the pH value sensor and the Na+ ion concentration sensor. The solution is then returned to the chamber by the return pipe, and the two sensors are separated a distance to prevent interference. The pH electrode uses the antimony electrode acidity sensor and the sodium electrode concentration sensor. The installation of the sensors and the principle diagram of the antimony electrode acidity sensor are shown in FIGS. 3 and 4. The two sensors are supplied with power of 24V, and the output is a current signal of 4-20 mA or a voltage signal of 0-10 V. The output signal of the pH value sensor is sent to the PLC and displayed in real time on the display screen through a communication port of the PLC, the signal of the sodium ion concentration sensor is sent to a transmitter or a detector and then sent to the PLC, the current value and the historical curve are displayed by the touch screen, and the display mode can be switched by touch. The PLC acquires signals every one minute to complete real-time display of parameters.

The salt solution storage tank is connected to a salt solution replenishing tank by a pipe under the control of on and off of a solenoid valve. The salt solution storage tank transmits a current signal of a pressure signal of 0-10V to the PLC through the lower liquid level pressure sensor. The PLC compares the pressure value with a preset value. When the liquid level is lower than a lower limit value, the PLC controls the solenoid valve relay and the pump relay to be turned on, the salt solution replenishing tank and salt solution storage tank solenoid valves are opened, and the salt solution is delivered from the salt solution replenishing tank to the salt solution storage tank. When the liquid level exceeds the set value, the PLC controls the pump to stop working first, and the relay of the solenoid valve will be turned off after a period of time. The on/off state of the solenoid valve, the operating state of the pump and the liquid level are displayed on the touch screen. The supply solenoid valve and the pump may also be manually controlled to be opened through the touch screen to replenish the storage tank with liquid solution. After the preset upper limit liquid level is reached, the PLC automatically controls the solenoid valve and the pump to be closed to stop the supply of the salt solution therein.

The invention claimed is:

1. A device for detecting and replenishing a salt solution in a salt spray machine, the device comprising:
    a salt solution collector, a return pipe, a salt solution storage tank, a programable logic controller, a pH value sensor, a water level sensor, a salt concentration sensor, a solenoid valve relay, a touch screen and a pump relay;
    wherein the salt solution collector is adapted to be installed at a bottom of the salt spray machine and configured to collect the salt solution, and the return pipe is connected to the salt solution collector and the salt solution storage tank;
    wherein the pH value sensor, the water level sensor and the salt concentration sensor are connected to the salt solution storage tank;
    wherein the solenoid valve relay and the pump relay are respectively connected to the salt solution storage tank;
    wherein the programable logic controller is in data connection with the pH value sensor, the water level sensor and the salt concentration sensor respectively, and receives a pH value signal, a liquid level signal and a salt concentration signal from the same respectively;
    wherein the programable logic controller is configured to send a solenoid valve control signal and a pump control signal to the solenoid valve relay and the pump relay according to the pH value signal, the liquid level signal and the salt concentration signal, and to receive a solenoid valve relay working state signal and a pump relay working state signal from the solenoid valve relay and the pump relay;
    wherein the programable logic controller is configured to display the pH value signal, the liquid level signal, the salt concentration signal, the solenoid valve relay working state signal and the pump relay working state signal on the touch screen, and to receive an operation signal from the touch screen; and
    wherein the programable logic controller is configured to control the solenoid valve relay and the pump relay according to the operation signal received from the touch screen.

2. The device for detecting and replenishing a salt solution in a salt spray machine according to claim 1, wherein a flow cell is further included between the return pipe and the collector, the pH value sensor and the salt concentration sensor are respectively installed on the flow cell, and the return pipe is further connected to one side of the flow cell.

3. The device for detecting and replenishing a salt solution in a salt spray machine according to claim 1, wherein the pH valve sensor is selected from the group consisting of an antimony electrode acidity sensor and a sodium electrode concentration sensor.

4. The device for detecting and replenishing a salt solution in a salt spray machine according to claim 1, wherein the programable logic controller is configured to acquire a pH value signal, a water level signal and a salt concentration signal of the pH value sensor, the water level sensor and the salt concentration sensor every minute.

5. The device for detecting and replenishing a salt solution in a salt spray machine according to claim 1, wherein the salt solution storage tank is also connected to a salt solution replenishing tank by a pipe, and an inlet of the salt solution storage tank is controlled by the solenoid valve relay.

6. The device for detecting and replenishing a salt solution in a salt spray machine according to claim 1, wherein the liquid level sensor is installed below the salt solution storage tank, and the liquid level sensor is a liquid level pressure sensor.

7. The device for detecting and replenishing a salt solution in a salt spray machine according to claim 1, wherein the programable logic controller is configured to control the solenoid valve relay to be turned on and allow the salt solution to enter the salt solution storage tank when the liquid level signal transmitted by the liquid level sensor is lower than a lower limit threshold; and to control the solenoid valve relay to be turned off and stop the salt solution to enter the salt solution storage tank when the liquid level signal transmitted by the liquid level sensor is higher than the lower limit threshold.

8. The device for detecting and replenishing a salt solution in a salt spray machine according to claim 1, wherein the salt solution collector comprises a liquid collection funnel, a liquid delivery pipe, a sensor and an overflow return pipe, an output end of the liquid collection funnel is connected to the liquid delivery pipe, and the liquid delivery pipe is connected to the sensor and the overflow return pipe.

9. A salt spray machine comprising the device according to claim 1, wherein the salt solution storage tank and a salt solution replenishing tank are respectively arranged at a top of a salt spray chamber, the salt solution storage tank is connected to the salt solution replenishing tank by a pipe, and an inlet of the salt solution storage tank is controlled by the solenoid valve relay; the salt solution storage tank is connected to a salt spray chamber pipe, and the salt spray chamber pipe is connected to a salt spray chamber nozzle.

* * * * *